United States Patent
Arai

(10) Patent No.: US 10,303,334 B2
(45) Date of Patent: *May 28, 2019

(54) INFORMATION PROCESSING DEVICE AND DISPLAY METHOD

(71) Applicant: SONY CORPORATION, Tokyo (JP)

(72) Inventor: Koji Arai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 142 days.

This patent is subject to a terminal disclaimer.

(21) Appl. No.: 15/370,772

(22) Filed: Dec. 6, 2016

(65) Prior Publication Data

US 2017/0083192 A1 Mar. 23, 2017

Related U.S. Application Data

(63) Continuation of application No. 13/511,167, filed as application No. PCT/JP2010/006388 on Oct. 29, 2010, now Pat. No. 9,542,087.

(30) Foreign Application Priority Data

Dec. 4, 2009 (JP) .................................. 2009-276942

(51) Int. Cl.
*G06F 3/0482* (2013.01)
*G06F 3/0488* (2013.01)
(Continued)

(52) U.S. Cl.
CPC .......... *G06F 3/0482* (2013.01); *G06F 3/0486* (2013.01); *G06F 3/0488* (2013.01);
(Continued)

(58) Field of Classification Search
CPC .......... G06F 3/041; G06F 2203/04101; G06F 2203/04808; G06F 3/0412; G06F 3/048
See application file for complete search history.

(56) References Cited

U.S. PATENT DOCUMENTS 5,740,390 A 4/1998 Pickover et al.
6,426,761 B1 * 7/2002 Kanevsky ............. G06F 3/0481
715/764

(Continued)

FOREIGN PATENT DOCUMENTS

JP 2007-65724 A 3/2007
JP 2007-293927 A 11/2007

(Continued)

OTHER PUBLICATIONS

International Search Report for JP Patent Application No. PCT/JP1 0106388, dated Feb. 1, 2011.

*Primary Examiner* — Olga V Merkoulova
(74) *Attorney, Agent, or Firm* — Chip Law Group

(57) ABSTRACT

An information processing device is provided that includes a display portion, a user recognition portion, a button selection portion, and a display control portion. The display portion displays at least one function button that is related to a function that the information processing device is capable of performing. The user recognition portion recognizes a user who is operating the information processing device. The button selection portion selects, from among the at least one function button that is displayed on the display portion, at least one function button that corresponds to the user who has been recognized by the user recognition portion. The display control portion moves the function button that has been selected by the button selection portion from an initial position on a display screen of the display portion such that the function button is close to a specified position on the display screen.

9 Claims, 11 Drawing Sheets

(51) Int. Cl.
  *G06F 3/0481*   (2013.01)
  *G06F 3/0486*   (2013.01)
(52) U.S. Cl.
  CPC ...... *G06F 3/04817* (2013.01); *G06F 3/04883* (2013.01); *G06F 3/04886* (2013.01)

(56) References Cited

U.S. PATENT DOCUMENTS

| | | |
|---|---|---|
| 8,027,518 B2 | 9/2011 | Baker et al. |
| 2002/0191029 A1* | 12/2002 | Gillespie ............... G06F 3/0481 715/810 |
| 2006/0197750 A1 | 9/2006 | Kerr et al. |
| 2008/0192024 A1* | 8/2008 | Mita ....................... G06F 3/044 345/173 |
| 2008/0309794 A1* | 12/2008 | Milgramm ............... G06F 21/32 348/231.99 |
| 2009/0109187 A1 | 4/2009 | Noma |
| 2010/0188342 A1 | 7/2010 | Dunn |
| 2011/0063236 A1 | 3/2011 | Arai et al. |
| 2012/0229411 A1* | 9/2012 | Arai ...................... G06F 3/0488 345/173 |

FOREIGN PATENT DOCUMENTS

| | | |
|---|---|---|
| JP | 2008-217548 A | 9/2008 |
| JP | 2009-9424 A | 1/2009 |
| JP | 2009-110286 A | 5/2009 |
| JP | 2009-193454 A | 8/2009 |

\* cited by examiner

[Fig. 1]
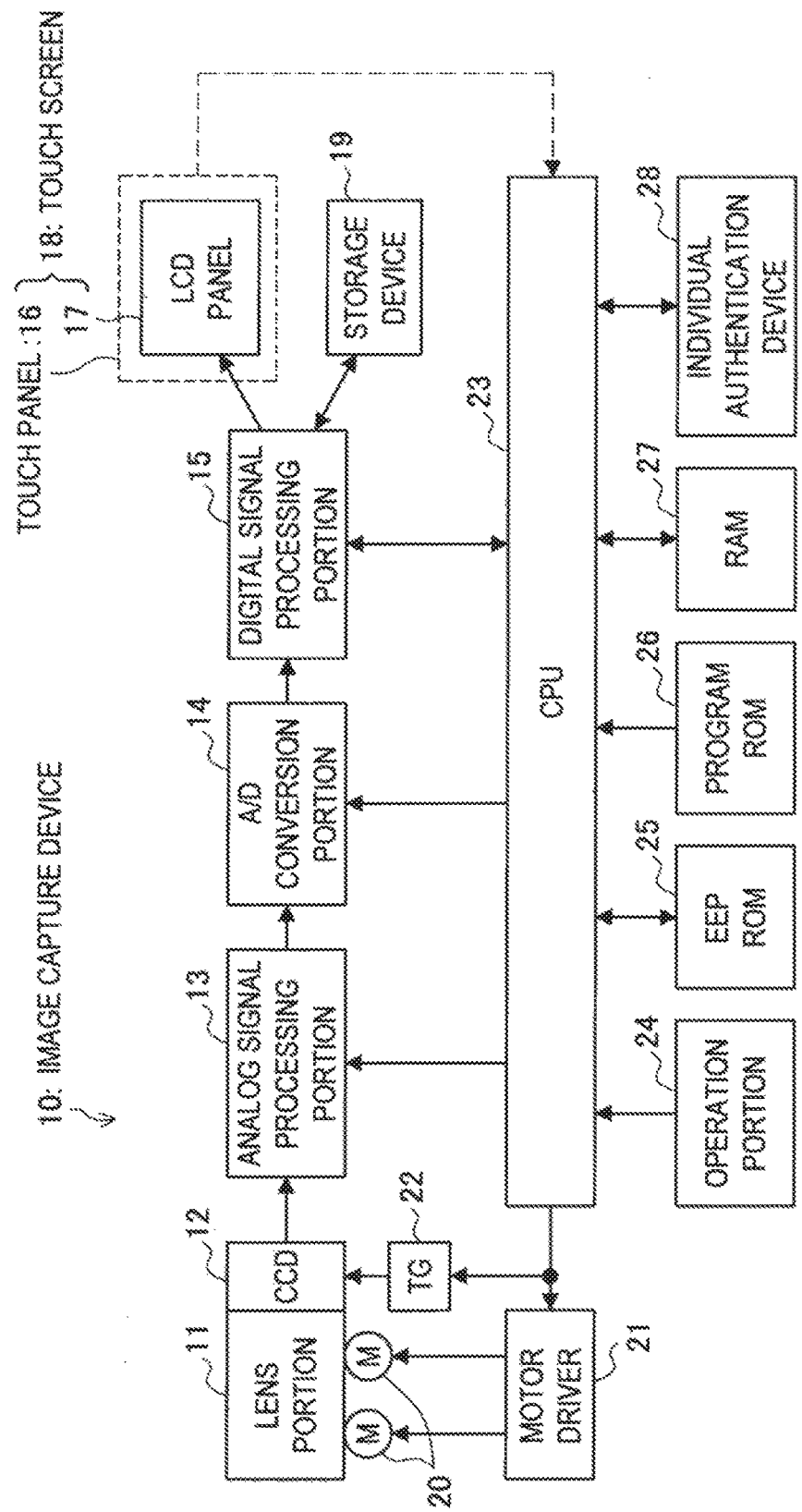

[Fig. 2A]
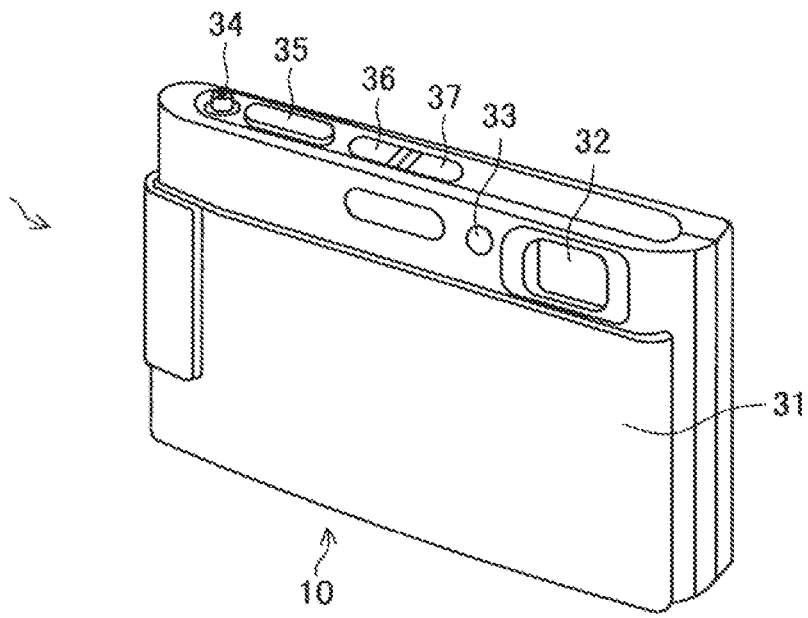
[Fig. 2B]
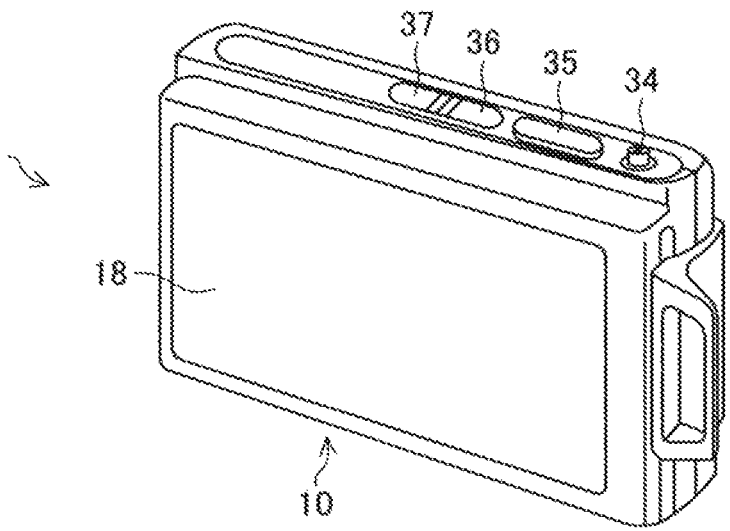

[Fig. 3]
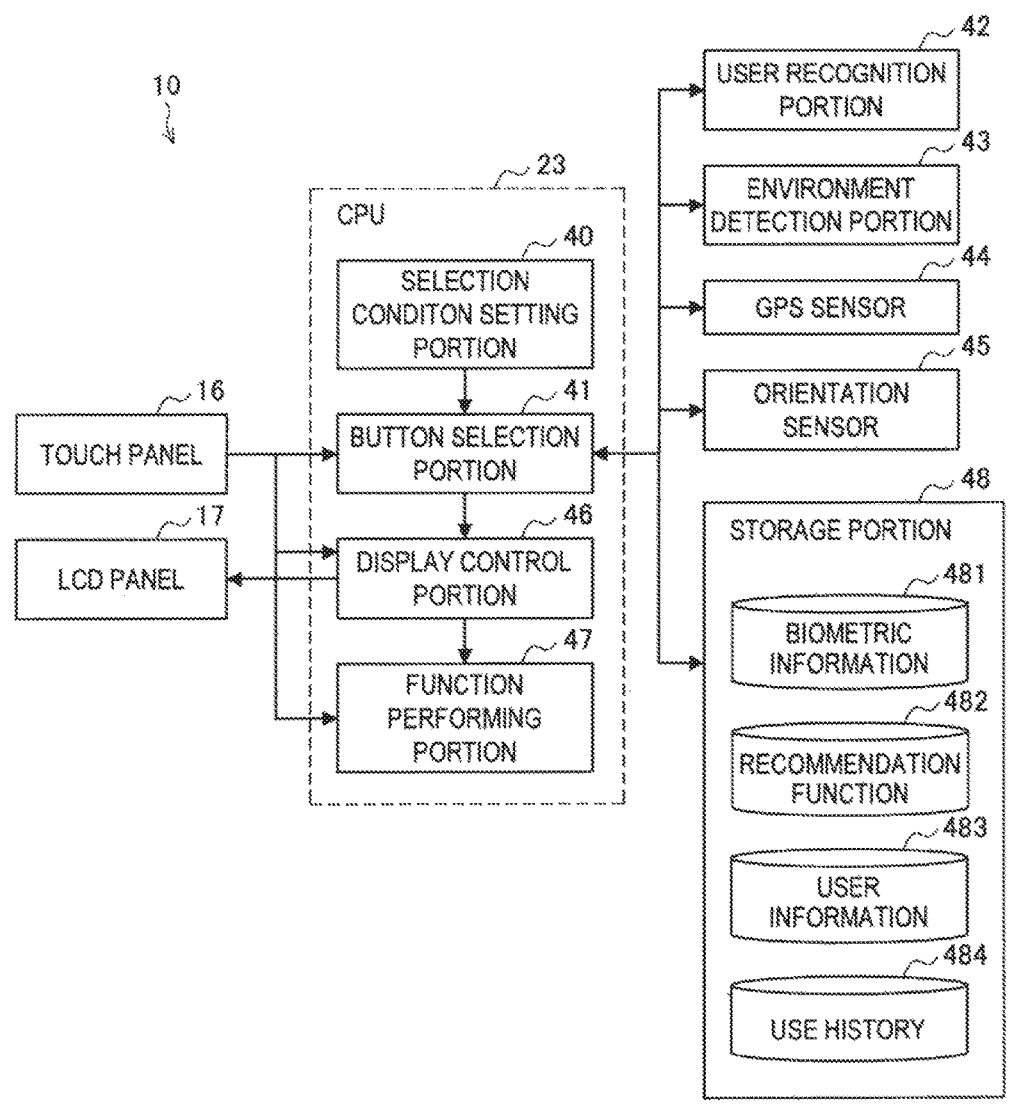

[Fig. 4]
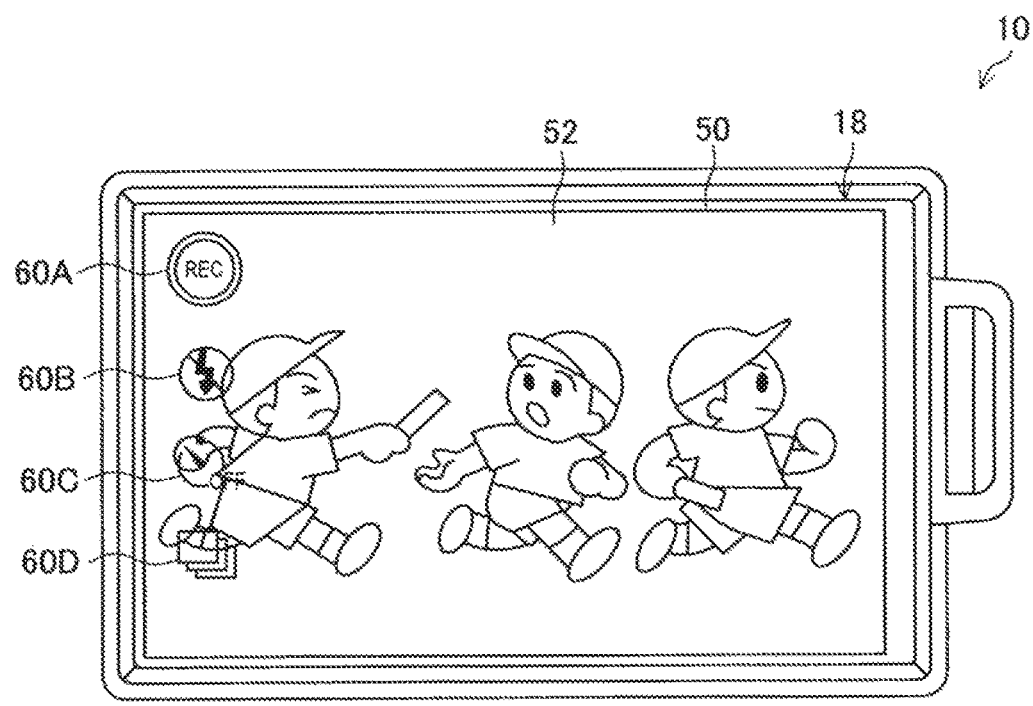

[Fig. 5]
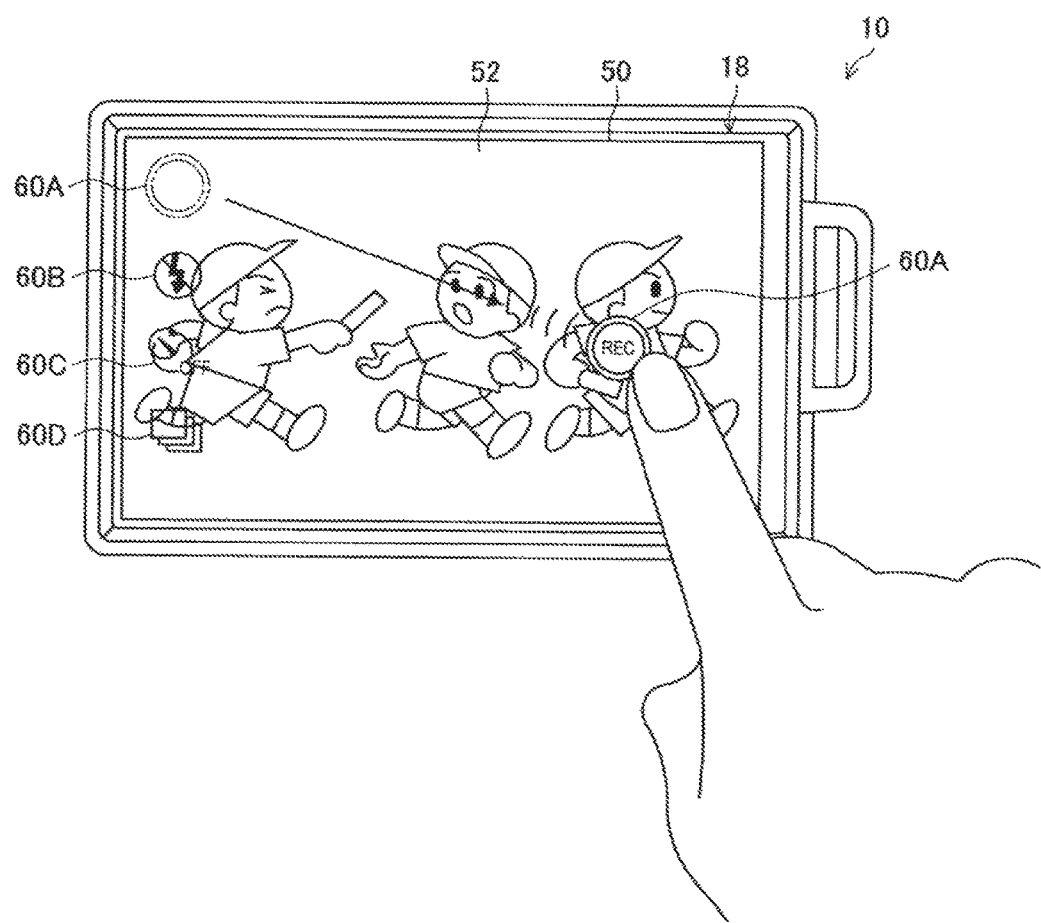

[Fig. 6]
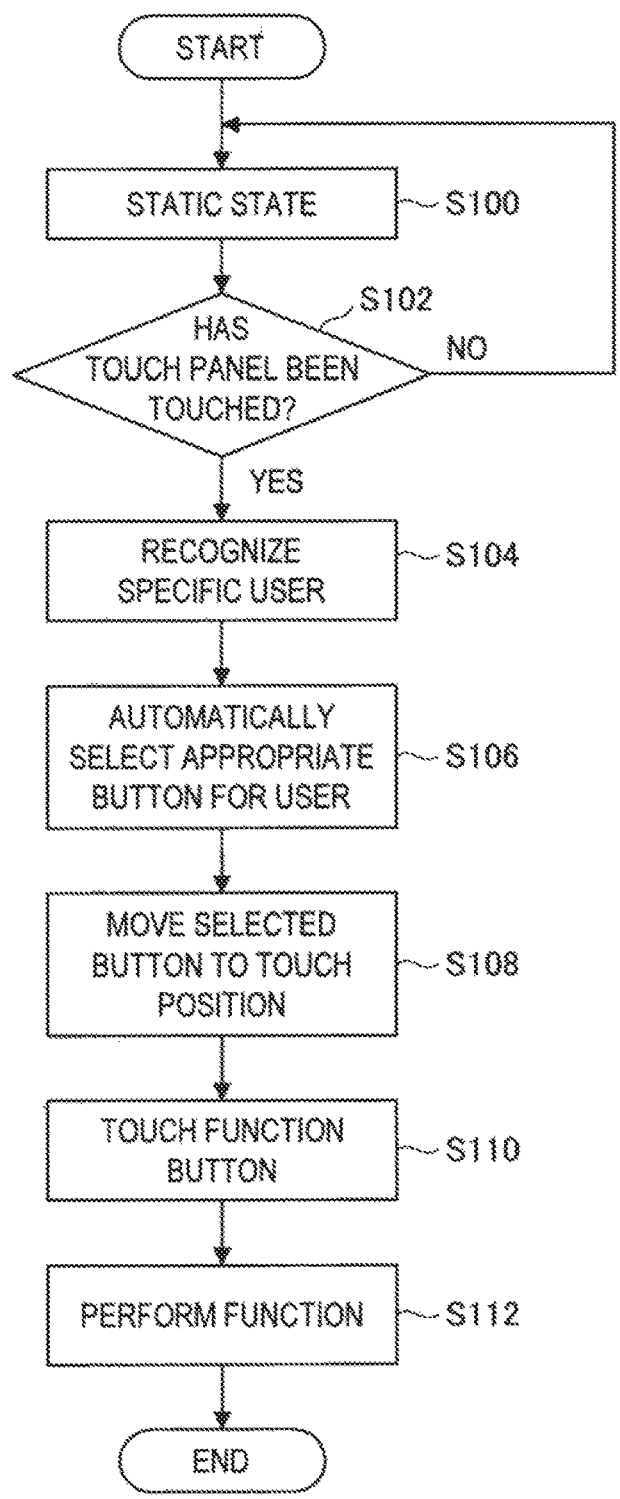

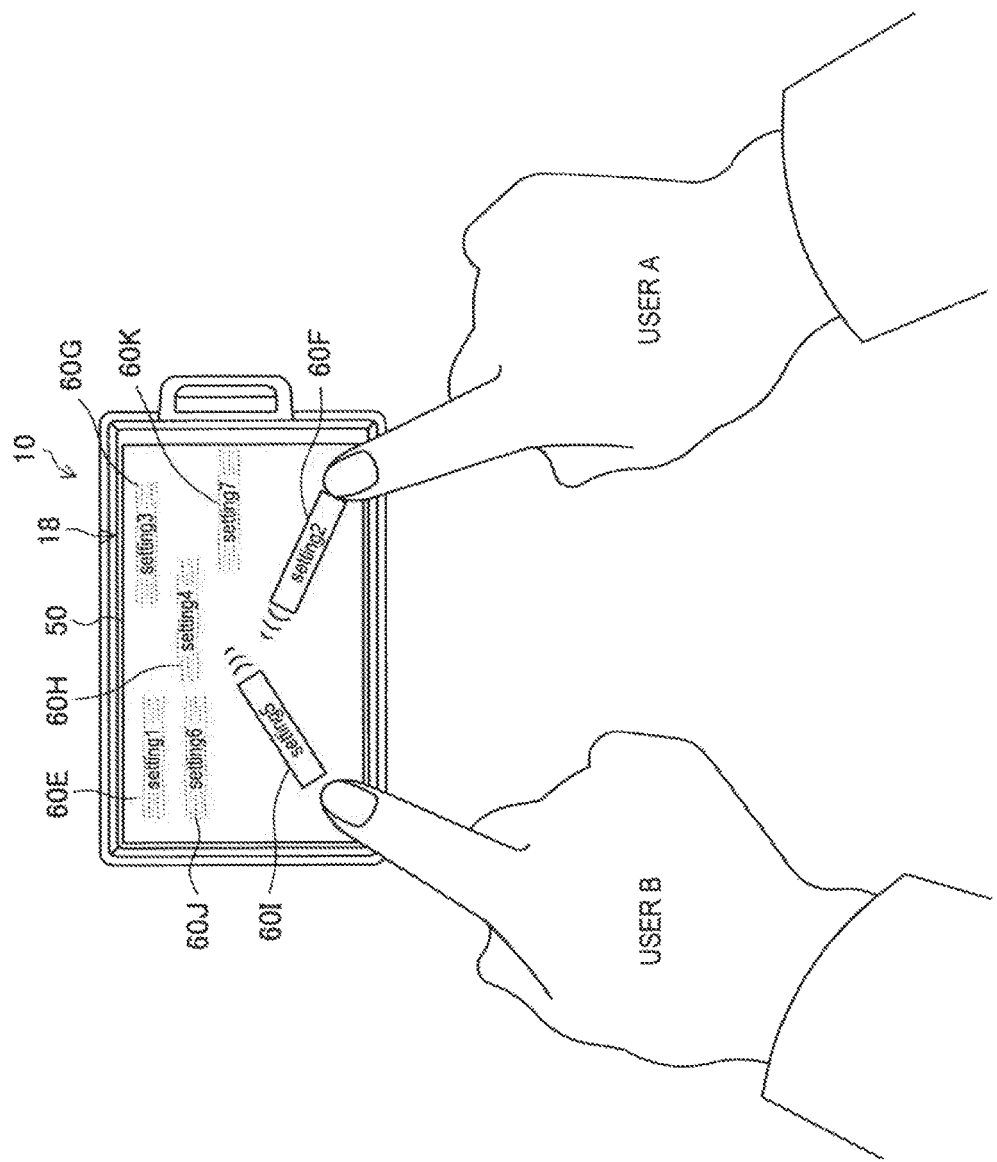

[Fig. 8]
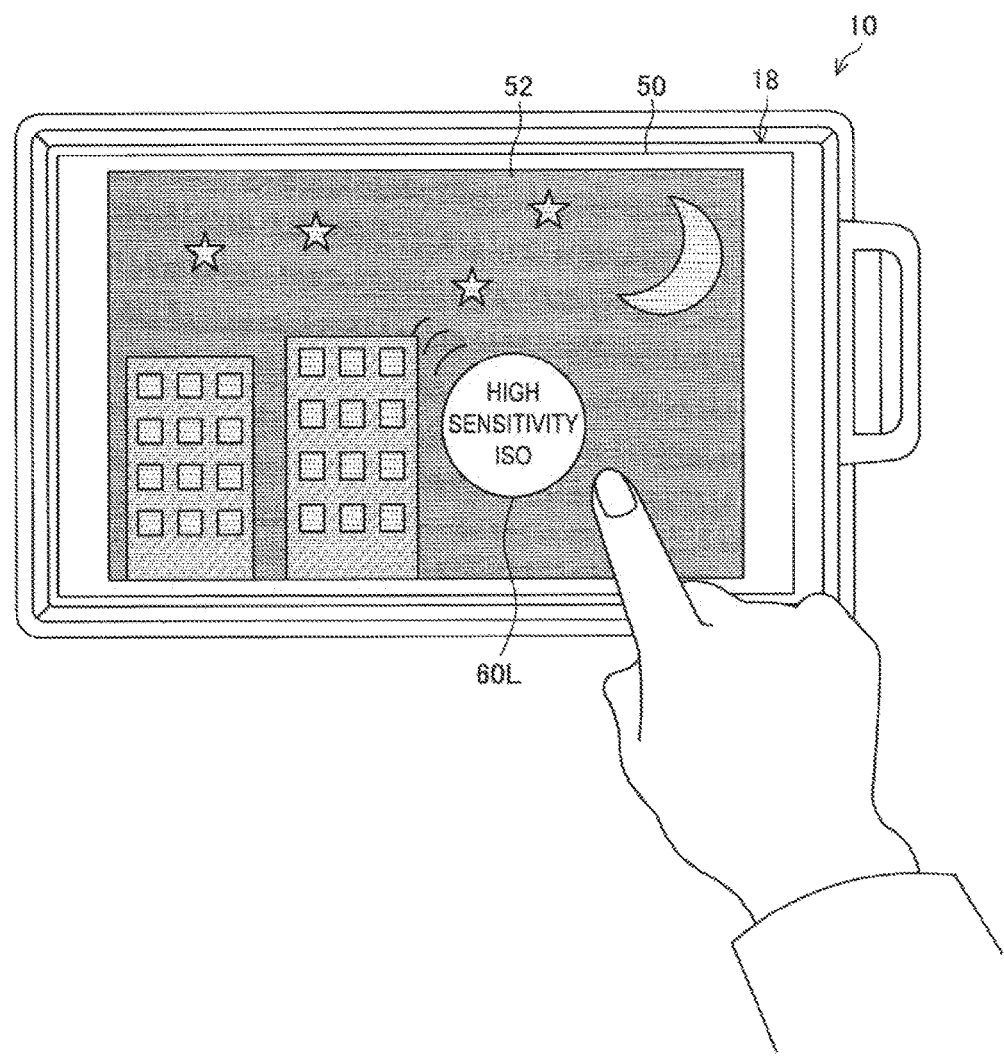

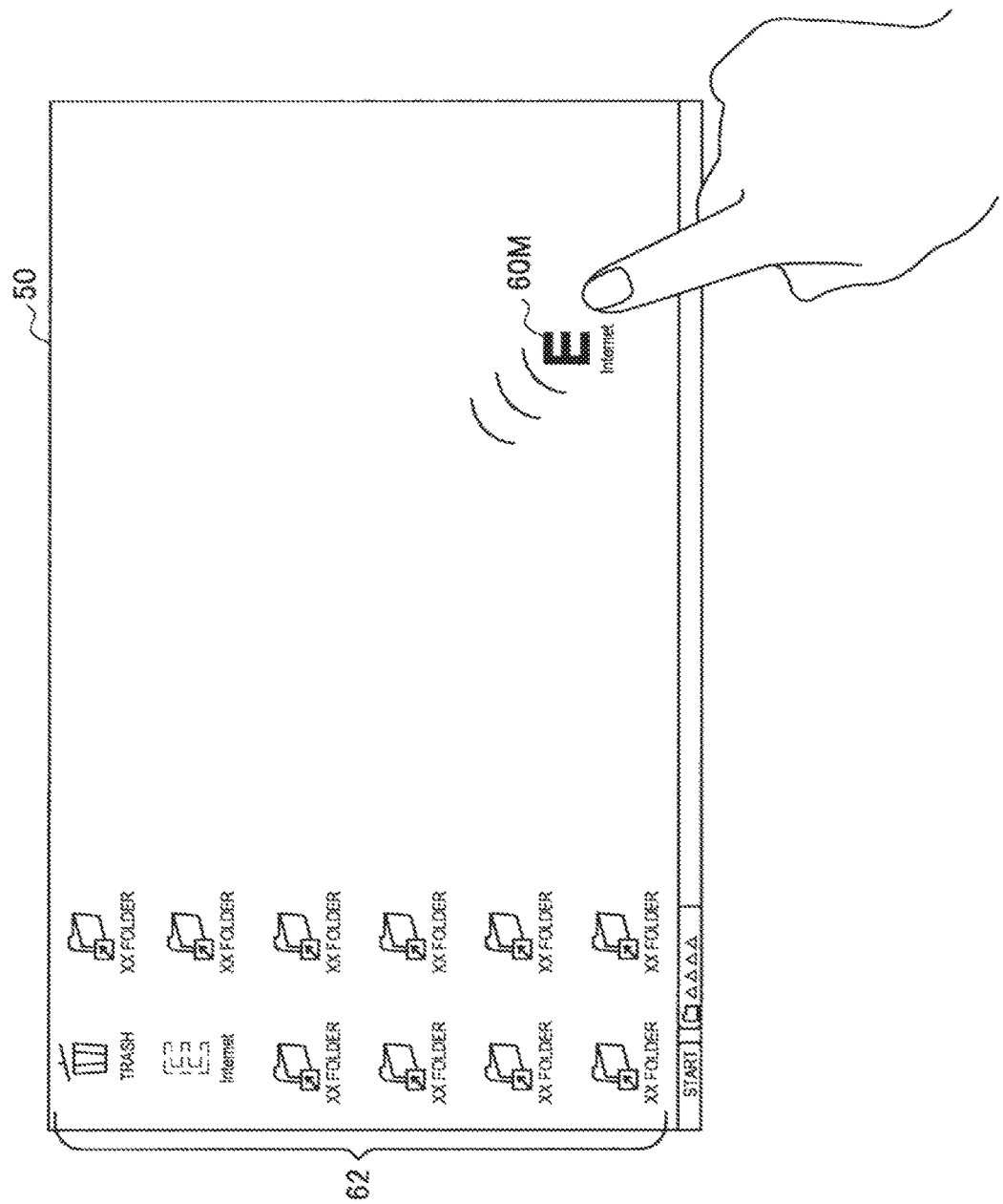

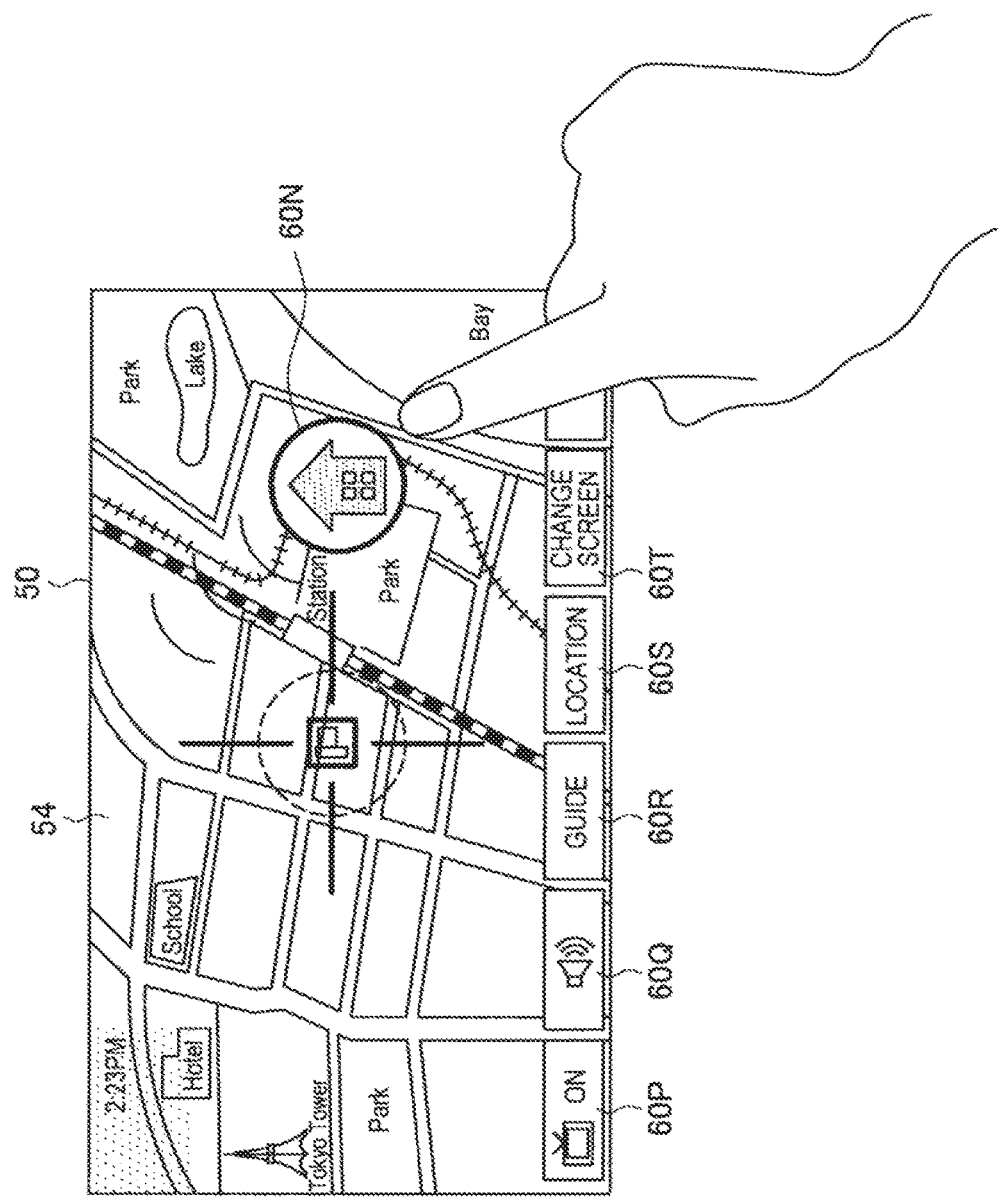

[Fig. 11]
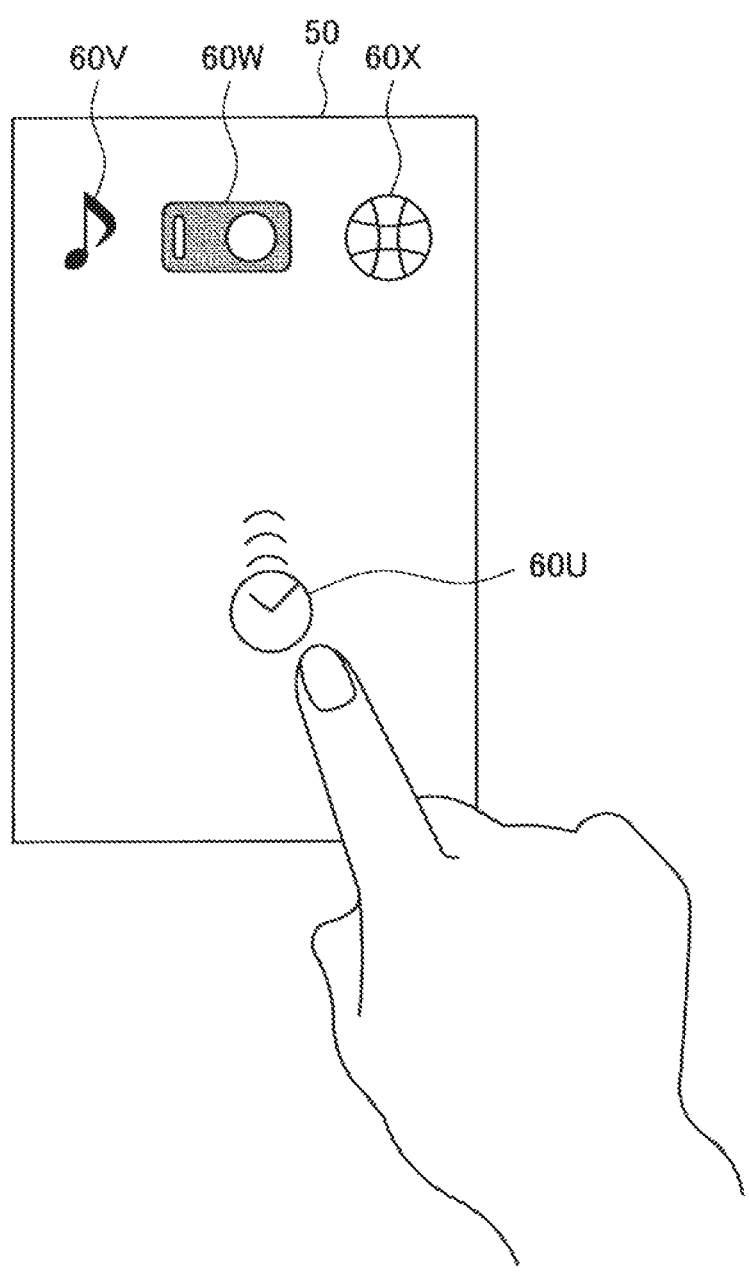

INFORMATION PROCESSING DEVICE AND DISPLAY METHOD

CROSS REFERENCE TO RELATED APPLICATIONS

The present application is a continuation application of U.S. patent application Ser. No. 13/511,167, filed May 22, 2012, which is a National Stage of PCT/JP2010/006388, filed Oct. 29, 2010, and claims priority to Japanese Priority Patent Application 2009-276942 filed on Dec. 4, 2009, the entire contents of which are incorporated herein by reference.

TECHNICAL FIELD

The present invention relates to an information processing device, a display method, and a program.

BACKGROUND ART

In recent years, touch panels have come to be widely used as operation portions of mobile devices such as digital cameras, portable video/audio players, mobile telephones, and the like. In a device that is equipped with this sort of touch panel, a user, by touching a function button that is displayed on a display screen of the mobile device, can issue a command to the mobile device to perform a function that corresponds to the function button (refer to Patent Document 1, for example.) In a case where a digital camera is used to record an image, for example, the user searches for a recording start button (called the REC button) on the display screen and starts recording the image by touching the button.

CITATION LIST

Patent Literature

Japanese Patent Application Publication No. JP-A-2009-009424

SUMMARY OF INVENTION

Technical Problem

However, in recent years, the functions with which mobile devices are equipped have become more numerous and varied, and devices have also come on the market that combine the functions of a digital camera, a mobile telephone, a video/audio player, and the like. The presence of these numerous and varied functions in a single device can be convenient for the user, but it has also made it more complicated for the user to operate the device in order to perform the numerous functions.

For example, in a case where a digital camera that is equipped with a touch panel has numerous functions, numerous function buttons are displayed on a display screen, and it is difficult for the user to find, among the numerous function buttons, the function button for performing a desired function. Furthermore, even if the numerous function buttons are classified and displayed hierarchically, it is difficult for a user who is not accustomed to using the device to understand where a desired function button is located and to locate that button. Moreover, if many different types of function buttons are displayed at the same time, the user may not understand what button corresponds to what function, making it all the more difficult to find the function button that corresponds to a desired function.

Accordingly, increasing the number of the function buttons on the display screen and making the form in which they are displayed more complicated makes it increasingly difficult for the user to find the function button for performing a desired function.

However, with the known electronic devices that are described above, all users perform the same operations (for example, finding the desired function button on the display screen, touching, dragging, and the like) in order to perform the desired function. Nevertheless, the frequency with which the individual functions are used and the environments in which they are used vary according to the individual user, and the functions that the manufacturers of the devices recommend to the users also vary according to the user's age, sex, proficiency, and the like. The function that is appropriate to the user who is operating the device thus varies for each individual user. It is therefore desirable to have a method that makes it possible for the individual user to easily find on the display screen the function button for the function that is appropriate to that particular user.

The present invention is made in view of the above-mentioned issue, and aims to provide an information processing device, a display method, and a program that are novel and improved and that make it possible for the individual user to easily find on the display screen the function button for a function that is appropriate to that particular user.

Solution to Problem

According to an aspect of the present invention in order to achieve the above-mentioned object, there is provided an information processing device that includes a display portion, a user recognition portion, a button selection portion, and a display control portion. The display portion displays at least one function button that is related to a function that the information processing device is capable of performing. The user recognition portion recognizes a user who is operating the information processing device. The button selection portion selects, from among the at least one function button that is displayed on the display portion, at least one function button that corresponds to the user who has been recognized by the user recognition portion. The display control portion moves the function button that has been selected by the button selection portion from an initial position on a display screen of the display portion such that the function button is close to a specified position on the display screen.

The information processing device may also include a position detection portion that detects a position on the display screen of the display portion that an operating object touched or approached. The display control portion may also move the function button that has been selected by the button selection portion from the initial position such that the function button is close to the position on the display screen that has been detected by the position detection portion.

The button selection portion may also select, from among the at least one function button that is displayed on the display portion, a function button for a function that is recommended to the user who has been recognized by the user recognition portion, based on an attribute of the user.

The user recognition portion may also recognize the user who is operating the information processing device based on biometric information for the user. The button selection portion may also determine the attribute of the user based on at least one of the biometric information for the user and the user's operating speed, then select a function button for a function that is recommended to the user based on the attribute that has been determined.

The button selection portion may also select, from among the at least one function button that is displayed on the display portion, a function button for a function whose frequency of use by the user is relatively high, based on use histories for a plurality of functions that the information processing device is capable of performing.

The information processing device may also include an environment detection portion that detects an environment surrounding the information processing device that the user is using. The button selection portion may also select, from among the at least one function button that is displayed on the display portion, a function button for a function that corresponds to the surrounding environment.

The user recognition portion may also recognize a plurality of users who are operating the information processing device at the same time. The button selection portion may also select, from among the at least one function button that is displayed on the display portion, at least one function button that corresponds to each of the plurality of the users who have been recognized. The display control portion may also move each of the at least one function button that has been selected by the button selection portion from an initial position on the display screen such that each of the at least one function button is close to a position on the display screen that has been designated by the corresponding user.

According to another aspect of the present invention in order to achieve the above-mentioned object, there is provided a display method that includes a step of displaying on a display portion at least one function button that is related to a function that an information processing device is capable of performing. The display method also includes a step of recognizing a user who is operating the information processing device. The display method also includes a step of selecting, from among the at least one function button that is displayed on the display portion, at least one function button that corresponds to the user who has been recognized. The display method also includes a step of moving the function button that has been selected from an initial position on a display screen of the display portion such that the function button is close to a specified position on the display screen.

According to another aspect of the present invention in order to achieve the above-mentioned object, there is provided a program that causes an information processing device to perform a step of displaying on a display portion at least one function button that is related to a function that the information processing device is capable of performing. The program also causes the information processing device to perform a step of recognizing a user who is operating the information processing device. The program also causes the information processing device to perform a step of selecting, from among the at least one function button that is displayed on the display portion, at least one function button that corresponds to the user who has been recognized. The program also causes the information processing device to perform a step of moving the function button that has been selected from an initial position on a display screen of the display portion such that the function button is close to a specified position on the display screen.

According to the configuration that is described above, at least one function button that is related to a function that the information processing device is capable of performing is displayed on the display portion, a user who is operating the information processing device is recognized, at least one function button that corresponds to the user who has been recognized is selected from among the at least one function button that is displayed on the display portion, and the function button that has been selected by the button selection portion is moved from an initial position on a display screen of the display portion such that the function button is close to a specified position on the display screen. Thus, when the user operates the information processing device, a function button that corresponds to the user, among the at least one function button that is displayed on the display portion, is moved from the initial position on the display screen such that the function button is close to the specified position.

Advantageous Effects of Invention

According to the present invention, it is possible for the individual user to easily find on the display screen the function button for a function that is appropriate to that particular user.

BRIEF DESCRIPTION OF DRAWINGS

FIG. 1 is a block diagram that shows a hardware configuration of an image capture device according to a first embodiment of the present invention.

FIGS. 2A, 2B are front oblique views and a rear oblique view that show the image capture device according to the first embodiment.

FIG. 3 is a block diagram that shows a functional configuration of the image capture device according to the first embodiment.

FIG. 4 is a figure that shows an example of a display on a display screen according to the first embodiment (before the display screen is touched).

FIG. 5 is a figure that shows an example of a display on the display screen according to the first embodiment (after the display screen is touched).

FIG. 6 is a flowchart that shows a method for displaying a function button according to the first embodiment.

FIG. 7 is a figure that shows an example of a display according to the first embodiment where function buttons that are appropriate for a plurality of users are moved.

FIG. 8 is a figure that shows an example of a display according to the first embodiment where a function button that is appropriate for a surrounding environment is moved.

FIG. 9 is a figure that shows an example of a display on a personal computer display screen according to another embodiment.

FIG. 10 is a figure that shows an example of a display on a car navigation device display screen according to another embodiment.

FIG. 11 is a figure that shows an example of a display on a mobile telephone display screen according to another embodiment.

DESCRIPTION OF EMBODIMENTS

Hereinafter, preferred embodiments of the present invention will be explained in detail with reference to the attached drawings. Note that in the specification and the drawings, structural elements that have substantially identical functional configurations are assigned identical reference numerals, and duplicate explanations will be omitted.

Note that the explanation will be presented in the order shown below.

1. Configuration of image capture device
2. Functional configuration of image capture device
3. Flow of display method
4. Specific example of display screen
5. Other embodiments
6. Conclusion

1. Hardware Configuration of Image Capture Device

First, a hardware configuration of an image capture device 10 according to a first embodiment of the present invention will be explained in detail with reference to FIG. 1. FIG. 1 is a block diagram that shows the hardware configuration of the image capture device 10 according to the present embodiment. An information processing device according to the present embodiment is embodied by the image capture device 10 in FIG. 1 as an example, but the information processing device is not limited to this example, and it can be applied to any electronic device.

As shown in FIG. 1, the image capture device 10 according to the present embodiment may be configured, for example, from a digital camera that is capable of acquiring one of still images and moving images (for example, a digital still camera, a digital video camera). The image capture device 10 takes digitally formatted image data that have been acquired by capturing an image of an object and stores the image data in a storage medium.

As shown in FIG. 1, the image capture device 10 according to the present embodiment is provided with an image capture portion that includes a lens portion 11, an image capture element 12, an actuator 20, a motor driver 21, a timing generator (TG) 22, and the like. The image capture portion captures an image of the object and outputs an image signal that is produced by the image capture.

The lens portion 11 is provided with an optical system (not shown in the drawings) that includes an image capture lens, a diaphragm, a focus lens, a zoom lens, and the like. The image capture element 12, which is a charge coupled device (CCD), a complementary metal oxide semiconductor (CMOS), or the like, is disposed on an optical path along which incident light from the object passes through the lens portion 11. The image capture element 12 takes an optical image of the light that is focused on an image capture plane by the lens portion 11, converts the light into electricity, and outputs the image signal.

The output from the image capture element 12 is electrically connected to an input of a digital signal processing portion 15 through an analog signal processing portion 13 and an analog-digital (A/D) conversion portion 14. The output from the digital signal processing portion 15 is electrically connected to inputs of a liquid crystal display panel 17 and a storage device 19. The analog signal processing portion 13, the A/D conversion portion 14, and the digital signal processing portion 15 configure a signal processing portion. The signal processing portion performs specified signal processing on the image signal that is output from the image capture element 12 and outputs the processed image signal to the liquid crystal display panel 17, which is a display portion, and to the storage device 19, which is a storage portion.

The actuator 20, which is a drive mechanism for performing adjusting of the diaphragm and moving of the focus lens, is mechanically connected to the lens portion 11. The actuator 20 is also connected to the motor driver 21, which performs drive control of the actuator 20. The motor driver 21 control the various portions of the image capture portion based on commands from a central processing unit (CPU) 23. During the image capture, for example, the motor driver 21 controls the actuator 20 of the image capture portion in accordance with user operations on an operation portion 24 and a touch panel 16, driving the zoom lens, the focus lens, the diaphragm, and the like such that the image of the object is captured with an appropriate focus, exposure, and the like. Based on a command from the CPU 23, the TG 22 outputs a timing signal to the image capture element 12 for controlling the image capture timing of the image capture element 12.

The touch panel 16 is an example of a position detection portion of the present invention and has a function that detects a position that has been touched or approached by an operating object that operates on a display screen of the display portion. The liquid crystal display panel 17 is an example of the display portion of the present invention and is configured from a liquid crystal display (LCD) or the like, displaying various types of data, such as images, text, icons, and the like, on the display screen. Note that the display portion can also use any display device other than an LCD, such as an organic electro luminescence (EL) display, a plasma display, or the like. The touch panel 16 is disposed such that it overlies the display screen of the liquid crystal display panel 17, and a touch screen 18 is configured from the touch panel 16 and the liquid crystal display panel 17. The touch panel 16 functions as an operation portion that accepts a user operation on the image capture device 10, and it detects a position on the display screen of the liquid crystal display panel 17 that is designated by the user.

Next, the touch panel 16 will be described in detail. The touch panel 16 functions as a sensor that detects a position that has been touched or approached by an operating object that operates on the display screen of the liquid crystal display panel 17. The touch panel 16 detects the position on the display screen that has been designated by the operating object, as well as a path of movement of the operating object and the speed of its movement. The operating object that is used in operating the touch panel 16 may be the user's finger, a stylus, a touch pen, or the like. The touch panel 16 detects the coordinates of the position on the display screen that the operating object has touched or approached, and the detected coordinate information is transmitted to the CPU 23, which performs specified processing.

Any type of touch panel, such as a pressure-sensitive type, a static electric type, an optical type, or the like, can be used as the touch panel 16. The pressure-sensitive touch panel detects a change in pressure when the panel is touched by the operating object. The static electric touch panel detects an electric signal that is due to static electricity that is discharged when the operating object touches the panel. The optical touch panel ordinarily uses an optical sensor that is provided in the outer frame of the display panel to detect the position and the direction of movement of the operating object that touches the panel. An Insel-type optical touch panel also exists that uses a different type of optical sensor. In the Insel-type optical touch panel, an optical sensor array is installed in the display panel, and the optical sensor array detects the position and the movement path of the operating object touched or approached the display panel.

Generally, the touch panel 16 is a contact-type touch panel (for example, the pressure-sensitive type or the static electric type described above) that detects the touch of the operating object. The user can perform various types of operations on the image capture device 10 by touching the face of the touch panel 16 with a finger, a stylus, or the like, and by moving the finger, the stylus, or the like that is in contact with the touch panel 16.

Note that a non-contact type of touch panel (for example, the optical touch panel described above) also exists that is capable of detecting that the operating object has approached the touch panel, even if the operating object has not touched the touch panel directly. In the explanation that follows, for the sake of convenience, a contact-type touch panel that detects the position that the operating object touches (the touch position) will be used as an example, but the position detection portion of the present invention can also be configured from one of a non-contact touch panel and another screen position detection device, for example, as long as the position on the display screen that is designated by the user can be detected.

The storage device 19 stores various types of data, such as video, audio, and the like, in a removable storage medium, such as an optical disk such as a Digital Versatile Disc (DVD) or the like, a memory card, a magneto optical disk, or the like. The storage device 19 can also be configured from a semiconductor memory that is built into the image capture device 10, as well as from a disk device such as an HDD or the like. Based on a command from the CPU 23, the storage device 19 takes the image signal that has been processed by the signal processing portion and stores it as image data in the storage medium. The storage device 19 is equivalent to the storage portion, which stores the image data that are produced by the image capture. The storage device 19 also functions as a playback portion that plays back the data that are stored in the storage medium.

The CPU 23 functions as a control portion that controls the various portions of the image capture device 10. The CPU 23 is connected to the motor driver 21, the TG 22, the operation portion 24, an electrically erasable programmable ROM (EEPROM) 25, a program ROM 26, a random access memory (RAM) 27, and the touch panel 16.

The semiconductor memories 25 to 27 functions as storage portions that store various types of information. For example, the EEPROM 25 stores data such as various types of set information and the like that need to be retained even after the power supply to the image capture device 10 is turned off. The program ROM 26 stores programs that the CPU 23 executes and data that are necessary for executing the programs. The RAM 27 serves as a work area when the CPU 23 performs various types of processing, temporarily storing the necessary programs and data. The CPU 23 performs various types of processing by reading the programs that are stored in storage media such as the program ROM 26 and executing the programs while utilizing the RAM 27.

The operation portion 24 is an operation unit that is provided separately from the touch panel 16, and it may include, for example, mechanical buttons such as a shutter button, a power supply button, and the like, switches, levers, dials, a plus key, and the like. The operation portion 24 may also include a contact sensor, an optical sensor, or the like that detects a specified user input. The operation portion 24 is operated by the user and supplies to the CPU 23 a signal that corresponds to the operation.

An individual authentication device 28 has a function that recognizes the user who is operating the image capture device 10. The individual authentication device 28 may, for example, be configured from a biometric authentication device that authenticates the user based on biometric information about the user (for example, a fingerprint, the iris of an eye, a vein, a voiceprint, or the like). The individual authentication device 28 may also be configured from an ordinary authentication device that authenticates the user based on user information that is input (for example, an ID and password that the user inputs to the image capture device 10, an ID that is read from an IC card by one of a contact system and a non-contact system, or the like).

Next, an example of an exterior configuration of the image capture device 10 according to the present embodiment will be explained with reference to FIGS. 2A, 2B. FIGS. 2A, 2B are front oblique views (FIG. 2A) and a rear oblique view (FIG. 2B) that show the image capture device 10 according to the first embodiment.

As shown in FIGS. 2A, 2B, the front face of the image capture device 10 is covered by a slide-type lens cover 31. An image capture lens 32 and an AF illuminator 33 that are included in the lens portion 11 are disposed such that they are revealed when the lens cover 31 on the front face is opened by being slid downward. The AF illuminator 33 also serves as a self-timer lamp. The touch screen 18 that is described above is provided on the rear face of the image capture device 10 such that it occupies the greater part of the rear face.

A zoom lever 34 (TELE/WIDE), a shutter button 35, a playback button 36, and a power button 37 are disposed on the top face of the image capture device 10. The buttons 34 to 37 are an example of the operation portion 24 that is shown in FIG. 1. Note that by pressing the shutter button 35, the user can issue a command (a release command) to capture a still image, but the user can also make the image capture device 10 according to the present embodiment capture an image by performing an input operation on the touch panel 16, so the shutter button 35 can be omitted.

Next, the operation of the image capture device 10 that is configured as described above will be explained. By executing the programs that are stored in the program ROM 26, the CPU 23 controls the various portions from which the image capture device 10 is configured and performs specified processing in accordance with signals from one of the touch panel 16 and the operation portion 24. For example, if a given position on the touch panel 16 is touched by a finger or the like, that is, if a specified operation input is made by the user, the coordinates of the position that is touched are detected by the touch panel 16, and a signal that corresponds to the coordinates is output to the CPU 23. The CPU 23 acquires specified information that corresponds to the coordinates and performs specified processing based on the information.

(1) AF Control

During the image capture, first, when the light from the object passes through the lens portion 11 and strikes the image capture element 12, the image capture element 12 captures an image of the object within an image capture range. That is, the image capture element 12 takes an optical image of the light that is focused on an image capture plane by the lens portion 11, converts the light into electricity, and outputs the analog image signal. At this time, the motor driver 21 operates the actuator 20 based on the control by the CPU 23. The operating of the actuator 20 causes the lens portion 11 to be exposed from and stowed in the case of the image capture device 10. The operating of the actuator 20 also causes the diaphragm that is included in the lens portion 11 to be adjusted and causes the focus lens that is included in the lens portion 11 to be moved. The focal point of the lens portion 11 is thus automatically focused on the object within the AF area (automatic focusing control).

(2) AE Control

Based on control by the CPU 23, the timing generator 22 supplies the timing signal to the image capture element 12. The exposure time and the like for the image capture element 12 are controlled by the timing signal. Operating based on the timing signal from the timing generator 22, the image capture element 12 receives the incident light from the object through the lens portion 11 and converts it into electricity, supplying the analog image signal to the analog signal processing portion 13 as an electrical signal that corresponds to the amount of light. Thus the exposure of the image of the object that is produced by the image capture is automatically adjusted to be appropriate (automatic exposure control).

(3) Signal Processing

Based on control by the CPU 23, the analog signal processing portion 13 performs analog signal processing (amplification and the like) on the analog image signal that was output from the image capture element 12, then supplies the resulting image signal to the A/D conversion portion 14. Based on control by the CPU 23, the A/D conversion portion 14 performs A/D conversion of the analog image signal from the analog signal processing portion 13 and supplies the resulting digital image signal to the digital signal processing portion 15.

Based on control by the CPU 23, the digital signal processing portion 15 performs digital signal processing of the digital image signal from the A/D conversion portion 14, including noise removal, white balance adjustment, color correction, edge reinforcement, gamma correction, and the like, as needed, then supplies the image signal to the liquid crystal display panel 17 for display.

(4) Display Processing for Live View Image

The digital signal processing portion 15 supplies moving image data from the A/D conversion portion 14 to the liquid crystal display panel 17, and the liquid crystal display panel 17 displays a live view image of the object that has been captured within the image capture range. The user uses the live view image (the moving image) to view the image capture range, the image angle, the state of the object, and the like, in order to capture a desired image.

(5) Compression and Storage Processing

The image capture device 10 performs compression and storage processing for the captured image. For example, in a moving image capture mode, in a case where a command to start recording a moving image has been input from one of the operation portion 24 and the touch panel 16, the CPU 23 controls the digital signal processing portion 15 and the storage device 19 such that the moving image data are recorded. For example, in a case where the user has touched a REC button that is displayed on the touch screen 18, the digital signal processing portion 15 takes the digital image signal from the A/D conversion portion 14 and compresses it using a specified compression encoding system, such as the Joint Photographic Experts Group (JPEG) system or the like, for example, then supplies the resulting compressed digital image signal to the storage device 19, where it is stored. Furthermore, in a still image capture mode, in a case where a shutter button in one of the operation portion 24 and the touch panel 16 has been operated, the CPU 23 controls the digital signal processing portion 15 and the storage device 19 such that the still image data are recorded. For example, in a case where the user has touched a shutter button that is displayed on the touch screen 18, a release signal is supplied to the CPU 23 from the touch panel 16. The CPU 23 controls the digital signal processing portion 15 in accordance with the release signal, compressing the image data for the still image and storing the compressed still image data in the storage device 19.

(6) Playback Processing

The image capture device 10 performs playback processing for the images that are stored in the storage device 19. In a playback mode, in a case where a playback command has been input from one of the operation portion 24 and the touch panel 16, the CPU 23 controls the digital signal processing portion 15 and the storage device 19 such that the image data that are stored in the storage medium are played back. For example, in a case where the user has touched a playback button that is displayed on the touch screen 18, the digital signal processing portion 15 expands the compressed image data that have been stored in the storage device 19 and supplies the expanded image data to the liquid crystal display panel 17 for display.

(7) Various Types of Setting Processing

Based on user inputs, the image capture device 10 performs setting processing for various types of functions that the image capture device 10 has. For example, in a case where the user has touched a function setting button that is displayed on the touch screen 18, the CPU 23 displays on the touch screen 18 a setting screen for the function that corresponds to the button that was touched. Then, based on a user operation on the setting screen, the CPU 23 sets the function. The functions of the image capture device 10 may include, for example, a flash image capture function, a self-timer capture function, a continuous image capture function, and functions to adjust the image quality and the size of the captured image, the exposure, the shutter speed, the white balance, and the like.

2. Functional Configuration of Image Capture Device

Next, a functional configuration that is related to display control of the function buttons that are a feature of the image capture device 10 according to the present embodiment will be explained with reference to FIG. 3. FIG. 3 is a block diagram that shows the functional configuration of the image capture device 10 according to the present embodiment.

As shown in FIG. 3, the image capture device 10 is provided with a selection condition setting portion 40, a button selection portion 41, a user recognition portion 42, an environment detection portion 43, a Global Positioning System (GPS) sensor 44, an orientation sensor 45, a display control portion 46, a function performing portion 47, and a storage portion 48. These functional portions are implemented by the executing by the CPU 23 of the programs that are stored in the program ROM 26 and the like, but the functional portions are not limited to this example, and they may also be implemented by dedicated hardware.

The selection condition setting portion 40 sets a selection condition for selecting of a function by the button selection portion 41, which will be described later. The selection condition setting portion 40 may set the selection condition based on a default condition setting, and it may also change the set condition based on a user input. The selection condition setting portion 40 may also change the selection condition dynamically based on an operating state or the like of the image capture device 10, such that a function button is selected that is appropriate for the operating state. The operating states of the image capture device 10 may include, for example, an operation mode of the image capture device 10 (for example, the moving image capture mode, the still image capture mode, the playback mode, a menu mode, a pause mode, or the like), the time that an operation mode has been in effect, one of a type and a state of an image that is displayed in an operation mode, a state of a user operation in an operation mode, and the like. The selection condition setting portion 40 may also change the selection condition dynamically based on an attribute of the user who is operating the image capture device 10, an operation time, an operation location, or the like, such that a function button is selected that is appropriate for the user attribute, the operation time, the operation location, or the like.

From among the plurality of the function buttons that are displayed in the display screen of the touch screen 18, the button selection portion 41 selects at least one of the function buttons that is appropriate for the user who is operating the image capture device 10, based on the selection condition that has been set by the selection condition setting portion 40. The user who is operating the image capture device 10 is specified by the user recognition portion 42.

The user recognition portion 42 is configured from the individual authentication device 28 that is described above (refer to FIG. 1) and the like, and it has a function that recognizes the user who is operating the image capture device 10. For example, in a case where the user recognition portion 42 is a biometric authentication device, the user recognition portion 42 uses various types of sensors (a camera, a microphone, and the like) for detecting biometric information on the user in order to acquire biometric information (for example, a fingerprint, the iris of an eye, a vein, a voiceprint, or the like) on the user who is operating the image capture device 10. The user recognition portion 42 then authenticates the user by comparing the acquired biometric information to official biometric information on the user that has been registered in advance in a biometric information database 481 of the storage portion 48. In a case where the user recognition portion 42 is a general authentication device, the user recognition portion 42 authenticates the user based on an ID and password that the user has input to the image capture device 10, an ID that has been read from an IC card by one of a contact system and a non-contact system, or the like. The user recognition portion 42 takes information that describes the user who has been authenticated as described above and transmits it to the button selection portion 41.

The button selection portion 41 selects, from among at least one function button that is displayed on the display screen of the liquid crystal display panel 17, at least one function button that corresponds to the user who has been authenticated by the user recognition portion 42. In this case, the function button that corresponds to the user may be the function button for a function that is appropriate for the user, for example. The function that is appropriate for the user may be, for example, a function (hereinafter called a recommended function) that the manufacturer of the image capture device 10 recommends to the user, a function that the user uses very frequently, a function that is appropriate for the environment around the image capture device 10 that the user is using, or the like.

The button selection portion 41 performs function button selection processing whenever any position on the display screen is designated by the user (by touch, for example). In other words, when the user designates (touches with the operating object) any position on the display screen of the touch screen 18, the touch panel 16 detects the position that has been designated on the display screen. The detection of the designated position by the touch panel 16 triggers the button selection portion 41, at the moment that the position is detected, to select, from among the plurality of the function buttons that are displayed on the display screen, a function button that is appropriate for the user who is operating the image capture device 10. Hereinafter, a specific example of the processing by which the button selection portion 41 selects the function button that is appropriate for the user will be described in detail.

(1) Selection of Recommended Function

Based on an attribute of the user who has been recognized by the user recognition portion 42, the button selection portion 41 selects the recommended function for the user from among the plurality of the function buttons that are displayed on the display screen. The recommended function may be, for example, a function that the manufacturer recommends to the user because the manufacturer wants the user to give priority to using that function, the recommended function being determined according to an attribute of the user. In order for the recommended function to be selected according to an attribute of the user, user attributes (for example, age, sex, hobbies, preferences, address, level of proficiency in operating the device, and the like) are stored in a recommended functions database 482 in the storage portion 48 in association with functions that are recommended to the user. In addition, user information (a user ID, a user name, the various types of user attributes that are described above) for at least one user who is operating the image capture device 10 is stored in advance in a user information database 483 in the storage portion 48. When the user who is operating the image capture device 10 has been recognized by the user recognition portion 42, the button selection portion 41 acquires the user attributes for the user from the user information database 483 and, referring to the recommended functions database 482, selects the function button for the recommended function that is appropriate for the user attributes.

The button selection portion 41 can also determine user attributes, such as the user's age, sex, and the like, based on the biometric information that has been recognized by the user recognition portion 42, such as the user's voiceprint, perspiration, iris, and the like. The button selection portion 41 can also determine the user's level of proficiency based on the user's operating speed and the like in relation to the touch panel 16. The button selection portion 41 selects the function button for the recommended function that is appropriate for the user attributes and level of proficiency that it has determined.

For example, for a user who is a beginner and whose operating speed is slow, a function button is selected for a function that makes it possible for the user to capture an image easily using the image capture device 10. On the other hand, for a proficient user whose operating speed is fast, a function button is selected for a function of the image capture device 10 that is advanced and specialized. Furthermore, in a case where the user is an elderly person, a function button is selected for a function that modifies character sizes, in order to display characters in a larger size. In contrast, in a case where the user is a young male who is accustomed to using the image capture device 10, a function button is selected for a function that is advanced and specialized.

Selecting the function button for the recommended function that is appropriate to the user attributes, as described above, makes it possible to give priority to presenting to the user who is operating the image capture device 10 a recommended function that is appropriate for the user.

(2) Selection of Frequently Used Function

Based on the user's history of using each of the functions of the image capture device 10, the button selection portion 41 selects, from among the plurality of the function buttons that are displayed on the display screen, the function button for a function that the user has used relatively frequently. Among the plurality of the functions with which the image capture device 10 is provided, the functions that the user has used relatively frequently may include, for example, the function that the user has used most frequently, a specified number of functions ranked in descending order by the frequency of use, functions for which the frequency of use is at least a specified value, or the like.

For each user, a use history for each of the functions of the image capture device 10 is stored in a use history database 484 in the storage portion 48 for use in selecting a function according to its frequency of use by the user. The use history may include, for example, information on the number of times each of the functions of the image capture device 10 has been used, the dates and times of use, the number of times the function has been used per a unit of time (that is, its frequency of use), the length of time that the function has been used, the user, and the like. The button 42 updates the use history database 484 every time that a given function of the image capture device 10 is used by the user. Then when the user who is operating the image capture device 10 is recognized by the user recognition portion 42, the button selection portion 41 acquires the user's use history from the use history database 484, determines what function has been used most frequently, and selects the function button for that function.

For example, when the image capture device 10 is in one of the image capture modes, the function button (that is, the shutter button) for the image capture and storage function, which is the function that is the most frequently by the recognized user, is selected. Further, in a function setting mode of the image capture device 10, the function button for a function for which the user frequently updates a setting is selected.

Selecting the function button for a function that the user uses very frequently, as described above, makes it possible to give priority to presenting to the user who is operating the image capture device 10 a function that the user uses very frequently.

(3) Selection of Function that is Appropriate for the Surrounding Environment

Based on the environment around the image capture device 10 (for example, particular environmental elements such as the light level, the noise level, and the like), as detected by the environment detection portion 43, the button selection portion 41 selects, from among the plurality of the function buttons that are displayed on the display screen, the function button for a function that corresponds to the environment around the user. The environment detection portion 43 is configured from elements that have functions for detecting the environment around the image capture device 10, such as a sensor that detects the light level for purposes of adjusting the exposure, a microphone that detects the noise level in the surrounding environment for purposes of adjusting the noise gain level, and the like. Information that describes the environment around the image capture device 10 that has been detected by the environment detection portion 43 is transmitted to the button selection portion 41. When the user who is operating the image capture device 10 has been recognized by the user recognition portion 42, the button selection portion 41 acquires from the environment detection portion 43 the information about the environment around the image capture device 10 that the user is using, determines the function that is appropriate for the surrounding environment, and selects the function button for that function.

The function button for the function that is appropriate for the surrounding environment is selected according to the environment around the image capture device 10 that the user is using, such as an indoors versus outdoors, a quiet location versus a noisy location, bright versus dark, and the like, for example. In a case where the user is using the image capture device 10 outdoors at night, for example, the function button for a high sensitivity image capture function is selected. In a case where the user is using the image capture device 10 on a train, a function button for setting a function that reduces noise leakage from an earphone is selected.

Selecting the function button for a function that is appropriate for the surrounding environment in which the user is using the image capture device 10, as described above, makes it possible to give priority to presenting to the user who is operating the image capture device 10 a function that is appropriate for the scene in which the user is using the image capture device 10.

(4) Selection of Other Functions

The button selection portion 41 can also select the function button based on a given selection condition other than the user who is operating the image capture device 10. For example, the button selection portion 41 may select the function button based on a condition such as (a) an object (for example, a person) in a display on the display screen, (b) a position (the touch position) that the user has designated on the display screen, (c) an icon (a function button, a file, or the like) that the user has designated, (d) one of the current position and the current time, (e) one of a touching pressure and a touching time of the operating object, (f) the orientation of the image capture device 10 (for example, its tilt, the direction it is facing), or the like. A combination of the selection conditions may also be used.

Various types of sensors and detectors are provided in order to furnish the selection conditions to the button selection portion 41 as described above. An object recognition portion that is not shown in the drawings uses a known object recognition function to recognize an object (for example, a person) within a captured image. The GPS sensor 44, by communicating with an external device, acquires GPS information (latitude and longitude information) that describes the current position of the image capture device 10. The orientation sensor 45 is configured from a gyroscopic sensor, an acceleration sensor, or the like and detects the orientation of the image capture device 10 (for example, the inclination in relation to three axes, the acceleration, or the like).

Next, the display control portion 46 will be explained. The display control portion 46 controls the liquid crystal display panel 17, which is the display portion, and causes various types of images to be displayed on the liquid crystal display panel 17. For example, the display control portion 46 takes the function button that has been selected by the button selection portion 41 and moves it from its initial position (its default display position) on the display screen such that it comes closer to the position on the display screen that has been detected by the touch panel 16. The position on the display screen that has been detected by the touch panel 16 is the position (the touch position) on the display screen that has been touched or approached by the operating object, and it is equivalent to the position on the display screen that has been designated by the user. Therefore, when the user touches the display screen, the function button that, among the plurality of the function buttons that are displayed on the display screen, is appropriate for the user moves close to the touch position.

The function performing portion 47, based on a user operation, performs the function that the user has designated (for example, recording of an image, playback, various types of settings, or the like). For example, when a recording button (the REC button, the shutter button) or the like that is displayed on the touch screen 18 is touched, the function performing portion 47 controls the storage device 19 such that the image that is being captured is stored in the storage medium.

As described previously, the image capture device 10 according to the present embodiment recognizes the user who is operating the image capture device 10, and when the user touches the display screen, the image capture device 10 selects the function button that is appropriate for the user and moves the function button from its initial position on the display screen such that it comes closer to the touch position. Among the plurality of the function buttons, only the function button that is appropriate for the user is moved closer to the touch position when the user touches the display screen on the touch screen 18, so the user can find the desired function button more easily.

Next, the moving display of the function button according to the present embodiment will be explained with reference to FIGS. 4 and 5. FIG. 4 is a figure that shows an example of a display on the display screen of the touch screen 18 according to the present embodiment (before the display screen is touched), and FIG. 5 is a figure that shows an example of a display on the display screen of the touch screen 18 according to the present embodiment (after the display screen is touched).

As shown in FIG. 4, when the operation mode of the image capture device 10 is one of the image capture modes, for example, a live view image 52 that shows the object in the image that is being captured by the image capture portion is displayed on a display screen 50 of the touch screen 18. A plurality of function buttons 60A to 60D (hereinafter collectively called the function buttons 60 in some cases) that are used in the image capture mode are displayed superimposed on the live view image 52. The function buttons 60 are parts of a graphical user interface (a GUI) that displays on the display screen 50 the buttons for performing the functions of the image capture device 10, and icons are used that indicate the characteristics of the functions of each of the function buttons 60. The function buttons 60 are displayed in initial positions (default positions) on the display screen 50 that are set in advance.

In the example that is shown in the drawings, the four function buttons 60A to 60D are displayed along the left edge of the display screen 50. Of these, the function button 60A is a REC button that is the function button for recording the image that is being captured. The REC button may be a recording start button for starting the recording of a moving image, and it may be a shutter button for recording a still image. The function button 60B is a flash setting button that is a button for setting the operation of the flash (for example, automatic, forced flash, no flash). The function button 60C is a self timer setting button that is a button for setting the operation of the self timer (for example, on/off, set time). The function button 60D is a continuous image capture setting button that is a button for setting the operation of continuous image capture that consecutively records a plurality of still images (for example, on/off, number of images).

In the state of waiting to record that is shown in FIG. 4, in a case where one of a still image and a moving image is recorded at the timing that the user desires, the user may find the REC button 60A on the display screen 50 and touch the REC button 60A, exactly as on the known device. However, depending on the circumstances, there may be cases in which the user cannot immediately find the desired REC button 60A among the four function buttons 60 that are displayed on the display screen 50, as well as cases in which the REC button 60A is hard to see because it is superimposed on the object in the live view image 52. Furthermore, because the REC button 60A is disposed on the left edge of the display screen 50, the user may find it difficult to touch the REC button 60A with a finger of the right hand.

Accordingly, in the image capture device 10 according to the present embodiment, when the user touches any position on the display screen 50, the REC button 60A moves closer to the position on the display screen 50 that the user has designated (the touch position), as shown in FIG. 5.

In other words, as shown in FIG. 5, in a case where the user wants to record the image in the state that is shown in FIG. 4, the user touches any position on the display screen 50 on which the live view image 52 is being displayed (the right edge in the example in FIG. 5). The operation of touching is equivalent to the designating of the position on the display screen 50. When the user touches the display screen 50, the touch panel 16 of the image capture device 10 detects the user's touch operation and the touch position (the designated position). The user recognition portion 42 also detects the biometric information for the user, for example, and based on the biometric information for the user, recognizes the user who touched the display screen 50. Then the button selection portion 41 selects, from among the four function buttons 60 that are being displayed on the display screen 50, the function button 60 that corresponds to the recognized user. The example in FIG. 5 shows a case in which the REC button 60A, which is the function button 60 that is used most frequently by the recognized user, has been selected. Then the display control portion 46 slowly moves only the selected REC button 60A from its initial position on the display screen 50 (the position that is shown by broken lines in FIG. 5) such that it moves closer to the position (the touch position) that was designated by the user. The display control portion 46 then stops the REC button 60A in the vicinity of the touch position (for example, slightly above the touch position). Moving the REC button 60A to a position slightly above the touch position is convenient, because the REC button 60A is no concealed by the user's finger.

As described above, in the present embodiment, when the user touches a position on the display screen 50, the REC button 60A is moved closer to touch position on the display screen 50 and is stopped in the vicinity of the touch position. Thus the user's action serves as a trigger that can move the REC button 60A, which is appropriate for that user, to a position on the display screen 50 that the user can easily recognize. Therefore, regardless of the circumstances, the user can easily find the desired REC button 60A among the plurality of the function buttons 60 on the display screen 50 without having to search for the desired REC button 60A. Furthermore, the user can record the image at the desired timing, without any instability, simply by using a finger of the right hand to touch the REC button 60A, which has been moved close to the right edge of the display screen 50.

Note that in the example in FIG. 5, the live view image 52 is displayed on the full screen of the display screen 50, and the function buttons 60 are displayed such that they are superimposed on the live view image 52, but the present invention is not limited to this example. For example, the display screen 50 in the image capture modes may also be partitioned in the a display area for the live view image 52 and a display area for the function buttons 60. Even in that case, the appropriate function button 60 can be moved close to the touch position at the moment that the user touches the display screen 50.

In the example in FIG. 5, in a case where the image capture device 10 is in a state in which the image can be recorded in the image capture modes, the image capture device 10 is set such that only the REC button 60A, which is frequently used in the image capture modes, is moved close to the touch position, on the assumption that the user wants to record the image. However, the present invention is not limited to this example. For example, in a case where one of the other function buttons 60B to 60D is moved close to the touch position, the user my register the desired function button 60 in the image capture device 10 in advance. The function button 60 whose frequency of use is the highest (for example, the flash setting button 60B) can be moved close to the touch position. The function button 60 for the function that the manufacturer recommends to the recognized user may also be moved close to the touch position. One of the surrounding environment (the light level, the movement speed of the object, the focal distance) and an action of the user may also be detected, and the function button 60 that is appropriate for the one of the surrounding environment and the user's action (for example, the flash setting button 60B, the continuous image capture setting button 60D, any of various types of setting buttons for the exposure, the shutter speed, and the like) may be moved close to the touch position. Furthermore, the number of the buttons that can be moved close to the touch position is not limited to one, and a plurality of the function buttons 60 that are one of appropriate for the operating state of the image capture device 10 at the moment when the display screen 50 is touched and appropriate for another selection condition may also be moved close to the touch position.

In the example that is described above, an example of performing a function was explained in which the user touches the function button 60 that has been moved close to the touch position. In addition to this, the user may also delete from the display screen 50 the function button 60 that has been moved close to the touch position by dragging and dropping the function button 60 to the trash. The user may also change the position of the function button 60 that has been moved close to the touch position to a desired position on the display screen 50 by dragging and dropping the function button 60 to the desired position.

3. Flow of Display Method

Next, a display method for the displaying of the function buttons 60 by the image capture device 10 according to the present embodiment will be explained with reference to FIG. 6. FIG. 6 is a flowchart that shows the display method for displaying the function buttons 60 according to the present embodiment.

As shown in FIG. 6, when the image capture device 10 is in a static state in any one of the operation modes, the plurality of the function buttons 60 that are used in that operating mode are displayed in their initial positions on the display screen 50 (Step S100). For example, when the operation mode of the image capture device 10 is one of the image capture modes, as shown in FIG. 4, the four function buttons 60 that are used by the image capture device 10 are displayed such that they are arrayed in their specified initial positions (on the left edge of the screen). When the operation mode of the image capture device 10 is the playback mode, the plurality of the function buttons that are used in the playback mode (for example, a play button, a delete button, a moving image frame-by-frame advance button, rotate and enlarge function buttons, and the like) are displayed in their initial positions, although this is not shown in the drawings.

When the image capture device 10 is in this sort of static state, the touch panel 16 detects whether or not the operating object has touched or approached any position on the display screen 50 (for example, whether or not the user's finger has touched the display screen 50) (Step S102).

When the user has designated a position on the display screen 50 by touching the display screen 50, the image capture device 10 then detects the biometric information (for example, a fingerprint, the iris of an eye, a vein, a voiceprint, perspiration, or the like) for the user who has touched the display screen 50 and recognizes the user based on the biometric information (Step S104).

The image capture device 10 then automatically selects, from among the plurality of the function buttons 60 that are displayed on the display screen 50, the function button 60 for a function that is appropriate for the user who was recognized at Step S104 (Step S106). For example, in the example that is shown in FIG. 5, the REC button 60A for performing the recording function that is frequently used in the image capture modes by the user who touched the display screen 50 is selected from among the function buttons 60A to 60D.

Next, the image capture device 10 slowly moves the function button 60 that was selected at Step S106 from its initial position on the display screen 50 to the position (the touch position) that was designated by the user at Step S102, such that the selected function button 60 is close to the touch position (Step S108). For example, in the example that is shown in FIG. 5, the REC button 60A is moved from its initial position in the upper left corner of the screen to the touch position in the middle of the right edge of the screen.

As just described, when the user touches the display screen 50 (Step S102), the user is recognized, and the specified function button 60 that is appropriate for the user is moved close to the touch position (Step S108). The user can thus easily find the function button 60 that is appropriate for him.

Thereafter, when the user touches the function button 60 that has been moved close to the touch position at Step S108 (Step S110), the touch panel 16 detects the designating of the function button 60 by the user, and the image capture device 10 performs the function that corresponds to the function button 60 (Step S112). For example, in the example that is shown in FIG. 5, when the REC button 60A that has been moved close to the touch position is touched, one of the moving image and the still image that is being captured at that moment is record in the storage medium.

The flow of the display method according to the present embodiment has been explained above. With the display method according to the present embodiment, the plurality of the function buttons 60 are displayed in their initial positions when the image capture device 10 is in the static state, but when the user touches the touch panel 16, the function button 60 for the function that is appropriate for the user is displayed as moving closer to the touch position on the display screen 50. The function button 60 that is moved close to the touch position in this manner may be, for example, a function button for one of a function that the manufacturer of the image capture device 10 recommends to the user, a function that is frequently used by the user, and a function that is appropriate for the environment around the image capture device 10 that the user is using. Because the user can thus easily find the function button 60 for the function that is the most appropriate for him, operating mistakes can be prevented, and the effort involved in searching for the function button 60 can be reduced.

4. Specific Examples of Display Screens

Next, specific examples will be explained in which an information processing device such as the image capture device 10 or the like automatically selects the function button 60 that is appropriate for the recognized user and moves the selected function button 60 on the display screen 50.

(1) Display of Moving Function Buttons that are Appropriate for a Plurality of Users First, with reference to FIG. 7, an example will be explained in which, in a case where a plurality of users A and B are operating the image capture device 10 at the same time, the image capture device 10 recognizes the plurality of the users A and B, then selects and moves function buttons 60F and 60I that respectively correspond to the users A and B.

As shown in FIG. 7, when the operation mode of the image capture device 10 is the function setting mode, for example, a setting screen for setting various types of functions of the image capture device 10 is displayed on the display screen 50 of the touch screen 18. At this time, a plurality of function buttons 60E to 60K for setting the various types of functions of the image capture device 10 are displayed on the display screen 50. When the user who is operating the image capture device 10 has not been recognized, each of the function buttons 60E to 60K is displayed in its initial position on the display screen 50.

In this state, when the display screen 50 is touched by the plurality of the users A and B, the image capture device 10 detects the biometric information for the users A and B and recognizes the users A and B. Then as shown in FIG. 7, the image capture device 10 selects the function buttons 60F and 60I that are appropriate for the recognized users A and B, respectively, and moves the function buttons 60F and 60I to the positions that the users A and B have respectively touched.

For example, the image capture device 10 may move the function button 60F, which is used most frequently by the user A, to the position that the user A touched (the lower right of the screen), and may move the function button 60I, which is used most frequently by the user B, to the position that the user B touched (the lower left of the screen). The image capture device 10 may also determine the attributes (age, sex, level of proficiency, and the like) of the users A and B based on the biometric information for and the operating speeds of the users A and B, then select the function buttons 60 for the functions that the manufacturer of the image capture device 10 recommends for the users A and B, respectively, based on the attributes of the users A and B. For example, the function button 60F for setting a specialized function that is recommended for the user A, who is a young male, may be moved to the position that the user A touched, and the function button 60I for setting a simple function that is recommended for the user B, who is the user A's mother, may be moved to the position that the user B touched. The function buttons 60F and 60I for functions that are related to individual information for the recognized users A and B (for example, a user information registration function) may also be moved to the touch positions.

As described above, when the plurality of the users A and B are operating the image capture device 10 at the same time, the individual users are recognized, and the function buttons 60F and 60I for the functions that are appropriate for the users A and B, respectively, are moved to the positions that the users A and B have respectively touched. Each of the users A and B can thus easily find the one of the function buttons 60F and 60I for the function that is appropriate for that user, without any operating errors.

(2) Display of Moving Function Buttons that are Appropriate for the Use History and the Surrounding Environment Next, with reference to FIG. 8, an example will be explained in which the function button 60 for a function that is appropriate for the user is selected and moved based on the user's history of using functions and on the environment around the image capture device 10.

The image capture device 10 stores a use history for each of the functions of the image capture device 10 in the use history database 484. The image capture device 10 also uses the environment detection portion 43 to detect the environment around the image capture device 10. The image capture device 10 is therefore able to select and move on the display the function button 60 for a function that is appropriate for the user (for example, a function that the user uses frequently, a function that the manufacturer of the image capture device 10 recommends for the user), based on the user's use history and on the surrounding environment.

For example, in a case where a user A who often captures images at night uses the image capture device 10 to capture an image at night, as shown in FIG. 8, the live view image 52 of the captured night scene is displayed on the display screen 50. At this time, if the user A touches the display screen 50, a function button 60L for a high sensitivity image capture function that is appropriate for image capture at night and that the manufacturer recommends is moved close to the touch position. The image capture device 10 determines from the user A's use history in the use history database 484 that the user A often captures images at night, then specifies a function from the recommended functions database 482 to recommend to the user A, who often captures images at night. The image capture device 10 is also able to use the environment detection portion 43 to detect the surrounding environment (the light level) and can recognize that the image capture is being performed at night.

As described above, the function button 60 that is appropriate according to the user's history of using functions and the state of the surrounding environment is moved close to the position that the user A has touched. The user A can thus easily find on the display screen 50 the function button 60 for a function that is suited to the surrounding environment and is consistent with the user A's own preferences.

5. Other Embodiments

An example in which the information processing device according to the present invention is applied to the image capture device 10 has been explained above, but the present invention is not limited to this example. The information processing device according to the present invention can be any electronic device, as long as it is a device that is provided with a display portion such as the liquid crystal display panel 17 or the like and the user recognition portion 42 that recognizes the user. For example, the present invention can be applied to a video/audio player (portable, onboard, or the like), a car navigation device, a personal computer, a mobile telephone, a personal digital assistant (PDA), a portable game device, a television receiver, an optical disk player/recorder, a digital photo frame, an automatic teller machine (ATM), a kiosk terminal, an information communication terminal such as a POS terminal or the like, an automatic vending machine, or the like.

Hereinafter, an example of an electronic device according to an embodiment other than the image capture device 10 that is explained above will be explained. Note that the electronic device that is hereinafter explained also implements the functional configuration that is shown in FIG. 3.

(1) Example of Application to a Personal Computer

Next, with reference to FIG. 9, an embodiment will be explained that applies the information processing device according to the present invention to a general-purpose computer, particularly to a personal computer (hereinafter called the PC). FIG. 9 is an example of the selecting and moving, on the display screen 50 of the PC, of a function button for a function that is used frequently by the user.

A large number of icons 62 are generally displayed on the display screen 50 (the desktop) of the PC, so there are cases in which it is difficult and bothersome for the user to find the icon (a function button 60M) for the desired function among the large number of the icons 62. Accordingly, in the PC according to the present embodiment, when the uses touches the touch panel type display screen 50, the user is recognized by the user recognition portion 42, and the function button 60M that is appropriate for the user is moved from its initial position such that it comes close to the touch position.

For example, as shown in FIG. 9, the function button 60M for performing a Web browser function may be moved close to the position on the display screen 50 that has been touched by the user. The function button 60M is the function button 60 for the Web browser function, which is the function that the user uses most frequently among the plurality of the functions that the PC has. The user who uses the browser function frequently can thus easily find the function button 60M for the Web browser function on the display screen 50.

Note that in the example in FIG. 9, a touch panel is used for the display screen 50 of the PC, and the function button 60M is moved close to the touch position, but the present invention is not limited to this example. For example, an ordinary operating device such as a keyboard, a mouse, or the like may be used as the operation unit instead of a touch panel being provided. In this case, the user may use the keyboard, the mouse, or the like to designate (for example, by clicking on) a position on the display screen 50, and the function button 60M may be moved close to the designated position.

The method for recognizing the user may also be a method whereby the biometric information for the user who is operating the PC is acquired and the individual is authenticated, but the present invention is not limited to this example. For example, the PC may recognize the user by having the user one of hold an IC card over a reader-writer with which the PC is equipped and input an ID and a password. In this case as well, even though the user does not designate a position on the display screen 50, the PC may move the function button 60 for a function that is appropriate for the recognized user to a specified position on the display screen 50 (for example, the lower right of the screen, where there are few of the icons 62). This also makes it easy for the user to find the desired function button 60.

(2) Example of Application to a Car Navigation Device

Next, an embodiment will be explained that applies the information processing device according to the present invention to a car navigation device, for example. The car navigation device is a device that works in conjunction with the GPS system to provide the current position of an automobile and directions to a destination. The touch panel 16 is also often used for the display portion of the car navigation device, and it is possible for the user to perform a specific function on the car navigation device by touching the corresponding function button 60 on the display screen 50.

FIG. 10 is an example of the selecting and moving, on the display screen 50 of the car navigation device, of the function button for a function that is used frequently by the user. As shown in FIG. 10, a map display image 54 is displayed on the display screen 50 of the car navigation device, and a plurality of function buttons 60N to 60T are displayed superimposed on the map display image 54. When the user touches the display screen 50, the car navigation device uses the user recognition portion 42 to recognize the user, then selects a function button 60N that is appropriate for the user and moves the function button 60N from its initial position to a position close to the touch position. For example, if the user touches a specified position on the display screen 50 (for example, the lower right of the screen), the function button 60N for designating a location where the user often goes (for example, home) is moved close to the touch position on the display screen 50. If the user then touches the function button 60N that has been moved close to the touch position, the car navigation device searches for and displays a route from the current position to the user's home.

The user can thus easily find, on the display screen 50, the function button 60N for a destination designation function that designates a destination to which the user frequently goes. It is particularly dangerous for the user to search for and touch the desired function button 60 on the display screen 50 while driving the automobile. However, if the appropriate function button 60 can be moved to the touch position just by touching the display screen 50, as in the present embodiment, the user's effort in searching for the button can be eliminated, so not only is this convenient for the user, it also improves safety.

(3) Example of Application to a Mobile Telephone

Next, an embodiment will be explained in which the information processing device according to the present invention is applied to a mobile terminal, specifically to a mobile telephone. FIG. 11 is an example of the selecting and moving, on the touch panel type display screen 50 of the mobile telephone, of the function button for a function that is used frequently by the user.

As shown in FIG. 11, when the user touches the display screen 50 of the mobile telephone, the mobile telephone uses the user recognition portion 42 to recognize the user, then selects a function button 60U that is appropriate for the user and moves the function button 60U from its initial position to a position close to the touch position. In the example in FIG. 11, a plurality of function buttons 60U to 60X are displayed on the display screen 50 (for example, a menu screen, a standby screen) of the mobile telephone. If the user touches a specified position on the display screen 50 (for example, the lower right of the screen), the function button 60U for a function that is frequently used by the user (for example, an alarm function) is moved close to the touch position on the display screen 50. If the user then touches the function button 60U that has been moved close to the touch position, a setting screen for the alarm function is displayed.

The user can thus easily find, on the display screen 50, the function button 60U for the function that the user frequently uses. In particular, because a large number of icons are displayed on the small display screen 50 of the mobile telephone, it is extremely convenient for the user to have the function button 60 that is appropriate for the user moved close to the touch position.

(4) Example of Application to a Music Player

Next, an embodiment will be explained in which the information processing device according to the present invention is specifically applied to a portable music player. In recent years, portable digital music players of a type that is provided with a display portion such as the liquid crystal display panel 17 or the like and with the touch panel 16 or the like have become more widely used. This type of music player records music to a storage medium and plays the music back from the storage medium. A large number of icons (including the function buttons 60) are also displayed on the display screen 50 of the music player, and by touching one of the function buttons 60 on the display screen 50, the user can cause the music player to perform a specific function.

A music playback screen for selecting the music to play back and for displaying an image of what is being played back is displayed on the display screen 50 of the music player. If the user touches the display screen 50 of the music player while the music is being played back, the music player uses the user recognition portion 42 to recognize the user, then selects a function button 60 that is appropriate for the user and moves it on the display screen 50.

For example, consider a case in which the operation mode of the music player is a music playback mode and the user touches the display screen 50 while the playback is stopped. In this case, the music player may select, as the function button 60 that corresponds to the user who touched the display screen 50, a play button that is frequently used by the user, for example. The user can thus easily find the play button and can start the playback of the desired music. Furthermore, in a case where the user touches the display screen 50 while the playback is in progress in the music playback mode, the stop button, which is frequently used by the user, is selected and is moved close to the touch position. The user can thus easily find the stop button and can stop the playback of the desired music.

The function button 60 can also be selected and moved on the display using a combination of the operating state and another selection condition. Specifically, in a case where the music player, while in the playback mode, detects that the surrounding environment is a particular environment, the music player selects and moves on the display a function button 60 that corresponds to the user and also corresponds to the surrounding environment. For example, in a case where the music player is being used in an environment where there is considerable noise, if the user touches the display screen 50, the music player detects the noise and moves a setting button for a noise canceling function to the touch position. Thus, with only the simple operation of touching the display screen 50, the user can easily find the setting button for the noise canceling function for adapting the playback to the noisy environment. Furthermore, in a case where the music player is being used on a train, if the user touches the display screen 50, the music player detects that it is on a train, based on the light level and a detection result from the GPS sensor 44, then moves to the touch position a setting button for a function that prevents sound from leaking from the earphones.

(5) Example of Application to a Menu Screen

Next, an embodiment will be explained in which the information processing device according to the present invention is applied to an electronic device that displays a menu screen. Menu screens are used by various types of electronic devices, but because a large number of function buttons 60 are displayed, it is sometimes difficult for the user to search for the desired function button 60. Accordingly, it is more convenient for the user if the function button 60 that corresponds to the operating state or the like of the device is moved close to the touch position on the menu screen.

For example, when the electronic device is first started and the menu screen is displayed, if the user touches the display screen 50, the electronic device recognizes the user, automatically selects the function button 60 that is appropriate for the user, and moves it to the touch position. Among the function buttons 60 that pertain to various types of initial settings, such as a time setting for a clock or the like, for example, the function button 60 that is appropriate for the user may be a setting button for a function that is appropriate for an attribute of the user, a setting button for a function that is recommended when an initial setting is made, or the like. The user can thus easily make an initial setting for an appropriate function, even when using an unfamiliar electronic device for the first time. Furthermore, even when the menu screen is displayed on an electronic device that is being used in a foreign country, the electronic device may automatically select the function button 60 for making a time setting, an area setting, and the like and move it close to the touch position. The user can thus easily make initial settings when using the electronic device in a foreign country.

6. Conclusion

The information processing device and the display method according to a preferred embodiment of the present invention have been explained above. According to the present embodiment, in response to the designating (for example, the touching) by the user of a position on the display screen 50, the function button 60 for a function that is appropriate for the user is moved from its initial position to the vicinity of the position that the user has designated on the display screen 50. Therefore, even in a case where a large number of the function buttons 60 are present on the display screen 50, the user can easily find the desired function button 60 on the display screen 50, so it is possible to eliminate the effort that is required to search for the function button 60.

In the known devices, all users perform the same operation to perform a given function. However, in the present embodiment, the device recognizes the user and moves the function button 60 that is appropriate for the user on the display screen 50, so it is possible for the user to find the appropriate function button 60 easily. In other words, the function or the scene that the user uses is different for each user, so instead of requiring all users to perform the same operation, the device presents the most suitable function for the attributes of the individual user and for the scene that the user is using. This produces a major improvement in convenience for the user.

Taking the function button 60 for the function that the user uses frequently and moving it close to the touch position particularly improves the convenience for the user. Because the attributes of the user are determined and the function button 60 for the recommended function that is appropriate for the attributes of the user is moved close to the touch position, it is possible to present to the user the function (the recommended function) that the manufacturer of the device wants the user to give priority to using. Moving close to the touch position the function button 60 that is appropriate for the user attributes and the surrounding environment improves the convenience for the user even more. Furthermore, appropriately combining the selection conditions, such as the user's frequency of use, the user's attributes, the surrounding environment, and the like, makes it possible to select the most appropriate function button 60 for the user who is operating the device.

In a case where a plurality of users are using the same device at the same time, the device recognizes each of the users and moves to the positions that have been designated by each of the users the function buttons 60 for the functions that are respectively appropriate for each of the users. This improves the operability for a plurality of users.

Even in a case where the user does not know which of the individual function buttons 60 on the display screen 50 correspond to which functions, the device moves the function button 60 that is appropriate for the user close to the touch position, so the user can easily find the desired function button 60.

With the known devices, it is sometimes difficult for the user to find the desired function button on a complex and dynamic display screen and to touch the button with the desired timing. On a complex and dynamic display screen, there may be cases where a large number of the function buttons are displayed superimposed on the display, such as a REC button (for example, a white button) that is displayed over a live view image (for example, a white object) that is always displayed in an image capture mode on the digital camera, for example. However, in the present embodiment, the desired function button 60 is moved close to the user-designated position (the touch position), so the user can easily find the desired function button 60 even on a complex screen like that described above.

Furthermore, because the function button 60 is moved close to the user-designated position, if the user designates a position on the display screen 50 that is easily operable, the user can simply touch the function button 60. For example, when the user wants to capture an image while holding a digital camera with both hands, if the user uses the thumb of the right hand to designate a position on the right edge of the display screen 50, the REC button 60A is moved close to the designated position, and the user can easily touch it with the thumb of the right hand.

The conditions for selecting the function button 60, instead of being only the attributes of the user who is operating the image capture device 10, may also be a combination of the surrounding environment, an object that is being displayed, a designated position on the display screen 50, a designated icon, one of a current position and a current time, one of the touching pressure and the touching time of the operating object, the orientation of the device, and the like. This makes it possible to select and move a function button 60 that is better suited to the user's preferences and the various circumstances.

A preferred embodiment of the present invention has been explained with reference to the attached drawings, but the present invention is not limited to this example. It should be clear to those who possess ordinary knowledge of the technical field of the present invention that various types of modified examples and revised examples are conceivable within the scope of the technical concepts that are described in the appended claims, and it should be understood that those modified examples and revised examples are obviously within the technical scope of the claims.

For example, in the embodiment that is described above, the function button 60 that is appropriate for the user is displayed close to touch position on the display screen 50 that the user has touched, but the present invention is not limited to this example. For example, instead of being moved close to the touch position, the function button 60 that is appropriate for the user may be displayed such that it at least one of shines, vibrates, and changes form (for example, becomes larger, changes color, becomes translucent, or the like). At least one of an animated display and a text displayed may also be added.

In the embodiment that is described above, the moving of the function button 60 is triggered when the user touches the display screen 50, but the present invention is not limited to this example. For example, the moving of the function button 60 may also be triggered by a user action such as tracing a path on the display screen 50 and dragging the function button 60 or shaking the device. The moving of the function button 60 may also be triggered by a condition other than a user action (for example, a time setting, a detection of an environmental factor, such as light, heat, pressure, acceleration, or the like, by a sensor, or the like).

The image capture device 10 according to the embodiment that is described above is equipped with the touch panel 16 and moves the function button 60 to the touch position on the display screen 50. However, the information processing device according to the present invention may also move the function button 60 to a given position on the display screen 50 even if it is not equipped with the position detection portion, such as the touch panel 16 or the like.

REFERENCE SIGNS LIST

10 Image capture device
18 Touch screen
23 CPU
24 Operation portion
28 Individual authentication device
40 Selection condition setting portion
41 Button selection portion
42 User recognition portion
43 Environment detection portion
44 GPS sensor
45 Orientation sensor
46 Display control portion
47 Function performing portion
48 Storage portion
481 Biometric information database
482 Recommended functions database
483 User information database
484 Use history database
50 Display screen
52 Live view image
60 Function button
60A REC button
60B Flash setting button
60C Self timer setting button
60D Continuous image capture setting button

The invention claimed is:

1. An information processing device, comprising:
a display portion configured to display a plurality of function buttons, wherein each function button of the plurality of function buttons is related to a function that the information processing device is capable to perform;
a user recognition portion configured to recognize a user who operates the information processing device;
a button selection portion configured to select at least one function button from the plurality of function buttons displayed on the display portion, wherein the selected at least one function button corresponds to the recognized user; and a display control portion configured to move the selected at least one function button from a first initial position on a display screen of the display portion to a specified position on the display screen.

2. The information processing device according to claim 1, further comprising:

a position detection portion configured to detect a position on the display screen of the display portion that an operating object touched or approached, wherein the display control portion is further configured to move the selected at least one function button from the first initial position to the detected position on the display screen.

3. The information processing device according to claim 1, wherein the button selection portion is further configured to select a first function button from the plurality of function buttons, and the selected first function button corresponds to a first function recommended to the recognized user based on an attribute of the user.

4. The information processing device according to claim 3, wherein the user recognition portion is further configured to recognize the user who operates the information processing device, based on biometric information for the user, and the button selection portion is further configured to:
determine the attribute of the user based on at least one of the biometric information for the user or a user operating speed; and
select the first function button for the function recommended to the user, based on the determined attribute.

5. The information processing device according to claim 1, wherein the button selection portion is further configured to select a second function button from the plurality of function buttons, the selected second function button corresponds to a second function whose frequency of use is higher than other functions of a plurality of functions that the information processing device is capable to perform, and the frequency of use is based on use histories for the plurality of functions that the information processing device is capable to perform.

6. The information processing device according to claim 1, further comprising:

an environment detection portion configured to detect an environment surrounding the information processing device, wherein the button selection portion is further configured to select a third function button from the plurality of function buttons, and wherein the selected third function button corresponds to a third function that corresponds to the environment surrounding the information processing device.

7. The information processing device according to claim 1, wherein the user recognition portion is further configured to recognize a plurality of users who operate the information processing device at a same time, the button selection portion is further configured to select a plurality of fourth function buttons, each fourth function button of the selected plurality of fourth function buttons corresponds to a respective recognized user of the plurality of the users, and the display control portion is further configured to move each fourth function button of the selected plurality of fourth function buttons from a respective second initial position on the display screen to corresponding positions on the display screen designated by the respective recognized user of the plurality of users.

8. A display method, comprising:

displaying, on a display portion, a plurality of function buttons, wherein each function button of the plurality of function buttons is related to a function that an information processing device is capable to perform;

recognizing a user who operates the information processing device;

selecting at least one function button from the plurality of function buttons displayed on the display portion, wherein the selected at least one function button corresponds to the recognized user; and moving the selected at least one function button from an initial position on a display screen of the display portion to a specified position on the display screen.

9. A non-transitory computer-readable medium having stored thereon, computer-executable instructions which, when executed by an information processing device, cause the information processing device to execute operations, the operations comprising:

displaying, on a display portion, a plurality of function buttons, wherein each function button of the plurality of function buttons is related to a function that the information processing device is capable to perform;

recognizing a user who operates the information processing device;

selecting at least one function button from the plurality of function buttons that is displayed on the display portion, wherein the selected at least one function button corresponds to the recognized user; and moving the selected at least one function button from an initial position on a display screen of the display portion to a specified position on the display screen.

* * * * *